United States Patent [19]

Vignes

[11] Patent Number: 4,948,938
[45] Date of Patent: Aug. 14, 1990

[54] PROCESS FOR FASTENING A PIPE BY WELDING TO A THICK WALL MEMBER SUCH AS A PIPE-CARRYING SHELL OF A NUCLEAR REACTOR VESSEL

[75] Inventor: Alain Vignes, Paris, France
[73] Assignee: Framatome, Courbevoie, France
[21] Appl. No.: 258,348
[22] Filed: Oct. 17, 1988

[30] Foreign Application Priority Data

Oct. 16, 1987 [FR] France ............................. 87 14322

[51] Int. Cl.⁵ .............................................. B23K 15/00
[52] U.S. Cl. ................................................ 219/121.14
[58] Field of Search ...................... 219/121.13, 121.14, 219/105

[56] References Cited

FOREIGN PATENT DOCUMENTS

| 2537115 | 3/1976 | Fed. Rep. of Germany . |
| 3437621 | 4/1986 | Fed. Rep. of Germany . |
| 2229010 | 12/1974 | France . |
| 0158887 | 12/1980 | Japan ............................. 219/121.14 |
| 0036083 | 2/1982 | Japan ............................. 219/121.14 |

OTHER PUBLICATIONS

A. Martin et al., "A Novel Design for PWR Pressure Vessels", *Nuclear Engineering International*, vol. 22, No. 262, Sep. '77, pp. 74 and 75.

*Primary Examiner*—C. L. Albritton
*Attorney, Agent, or Firm*—Pollock, Vande Sande & Priddy

[57] ABSTRACT

A connecting surface (24) of frusto-conical shape whose axis coincides with the axis of a pipe (23), having an apex semi-angle close to 45° and a section of transverse dimension decreasing towards the end of the pipe (23) is produced on an end part of the pipe (23). A connecting surface (25) of frusto-conical shape corresponding to the shape of the connecting surface (24) of the pipe is produced on the wall member (20). The connecting surfaces (24, 25) are placed so that they coincide, and the pipe and the wall member are welded by means of an electron beam in a single pass and without filler metal, along their connecting surfaces (24, 25) from the side of the wall (20) onto which the widened part of the connecting surface (25) of the opening (22) opens. The invention applies particularly to the fastening of pipes (23) to a pipe-carrying shell (20) of a pressurized-water nuclear reactor vessel.

5 Claims, 3 Drawing Sheets

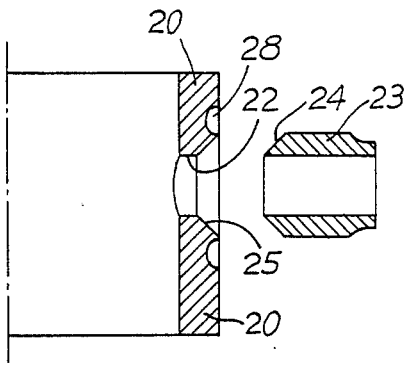
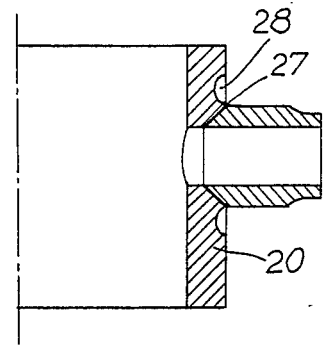
FIG. 6a  FIG. 6b
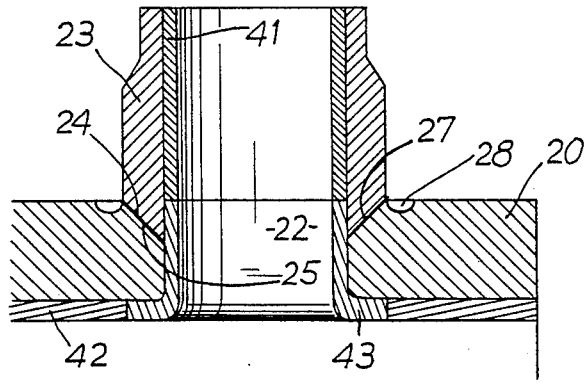
FIG. 7
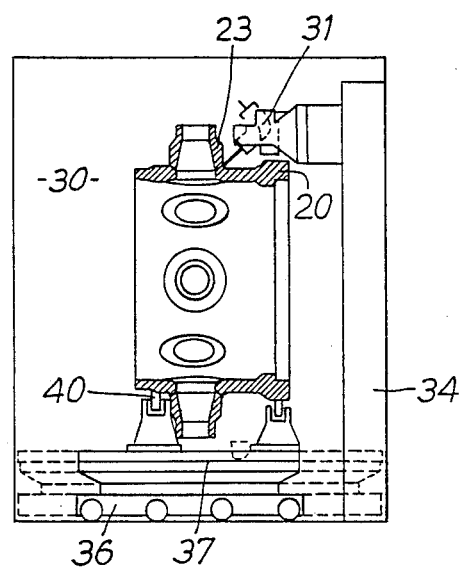
FIG. 8

PROCESS FOR FASTENING A PIPE BY WELDING TO A THICK WALL MEMBER SUCH AS A PIPE-CARRYING SHELL OF A NUCLEAR REACTOR VESSEL

FIELD OF THE INVENTION

The invention relates to a process for fastening a pipe by welding to a thick wall member and in particular, but not exclusively, a process for fastening pipes to a pipe-carrying shell of a light-water nuclear reactor vessel.

BACKGROUND OF THE INVENTION

Light-water nuclear reactors, and especially pressurized-water nuclear reactors, comprise a vessel of overall cylindrical shape closed by dished bottoms. The cylindrical part consists of forged shells which are welded end to end at the time when the vessel is being assembled. One of these shells, called a pipe-carrying shell, comprises openings passing through its wall in the region of which is produced the fastening of pipes intended to be connected to the pipework forming the hot legs and the cold legs of the primary circuit loops.

The process employed most widely until now for producing the fastening of the pipes to the pipe-carrying shell consists in providing openings passing through the shell of a diameter greater than the external diameter of the pipe which is engaged in the opening over the entire thickness of the shell wall. Parts which are machined in a corresponding manner on the pipe and in the opening of the shell permit one or more welding chamfers to be produced, which are then filled with filler metal from the outside and/or the inside of the shell. This operation is carried out using the automatic submerged arc welding process.

In the case of nuclear reactors whose vessel has a diameter of the order of 4.50 meters, the thickness of the pipe-carrying shell is slightly below 300 mm, this thickness being substantially uniform in all parts of the shell.

A different process for fastening the pipes of a pipe-carrying shell has also been proposed. This process consists in providing in the pipe-carrying shell openings whose diameter corresponds substantially to the internal diameter of the pipe, which is welded over its entire thickness in the extension of the opening, on the outer side of the shell wall.

This method of fastening the pipe, where the latter is added, i.e., "set" on the outer surface of the shell, is referred to by the expression "set-on", in contrast to the method of fastening described above, where the tube enters the opening passing through the shell, this method of fastening being referred to by the expression "set-in".

In theory, the "set-on" configuration resulting from the second method of fastening offers advantages over the "set-in" configuration, since a weld fault giving rise to a failure would constitute an accident of a type provided for in the safety specifications of nuclear power stations, this accident being equivalent to the failure of a primary circuit leg, resulting in a loss of coolant at a very high rate.

In the case of the "set-in" configuration, a fault in the weld of a pipe resulting in a failure constitutes an accident equivalent to a vessel failure.

However, the "set-on" design requires the use of a pipe-carrying shell of increased thickness and the presence of outwardly projecting parts on this shell, onto which the pipes are set. In fact, it is not possible to carry out automatic submerged arc welding of the pipe in a region which is flush with the external surface of the shell, because of the bulk of the welding head.

In the case of a reactor vessel with a diameter close to 4.50 m, it is therefore necessary to provide a pipe-carrying shell whose thickness is of the order of 400 mm in its main part and which can go up to 450 mm in the region of the projections onto which the pipes are set. The forging of such shells requires the use of initial ingots of very great mass, of the order of 350 tons.

Furthermore, the execution of automatic submerged arc welding of the pipes is a tricky operation which requires numerous checks.

More generally, in the case of reactors or of vessels of any type whatever which comprise a thick wall, for example thicker than 100 mm, there was no known process for fastening pipes by welding, simple to implement and requiring a shorter time to perform, enabling a very high weld quality to be ensured.

SUMMARY OF THE INVENTION

The purpose of the invention is therefore to provide a process for fastening a pipe by welding to a thick wall member comprising at least one passage opening whose diameter is substantially equal to the internal diameter of the pipe, the pipe being welded over its entire thickness into the extension of the opening on one of the sides of the wall, this process making it possible to simplify the production of the weld and to shorten the time needed to perform it, while enabling a weld of very high quality to be obtained and a wall of limited thickness to be used.

For this purpose, a connecting surface of frusto-conical shape whose axis coincides with the axis of the pipe having an apex semi-angle of between 30° and 60° and a section of transverse dimension decreasing towards the end of the pipe is produced on an end part of the pipe, a connecting surface of frusto-conical shape corresponding to the shape of the connecting surface of the pipe opening onto the external side of the wall and widened in the direction of this side of the wall is produced on the wall member, on only a part of its thickness, in the region of the opening and coaxially with this opening, the connecting surfaces of the pipe and of the wall are placed so that they coincide, and the pipe and the wall member are welded using an electron beam in a single pass and without filler metal along their connecting surfaces, from the external side of the wall.

BRIEF DESCRIPTION OF THE DRAWINGS

In order that the invention may be more clearly understood, a description will now be given, by way of example, with reference to the appended drawings, of an embodiment of the process according to the invention in the case of a pipe-carrying shell of a pressurized-water nuclear reactor vessel.

FIGS. 6A and 6B are views in axial section, such as the view along 6—6 in FIG. 3, of a pipe-carrying shell produced according to the process of the invention, before and after the welding of a pipe.

FIG. 7 is a larger-scale view in axial section showing a pipe fastened according to the process of the invention to a shell and internally lined with stainless steel.

FIG. 8 is a view in vertical section of an electron beam welding unit permitting the use of the fastening process according to the invention.

DESCRIPTION OF THE PREFERRED EMBODIMENT

Figure 1:
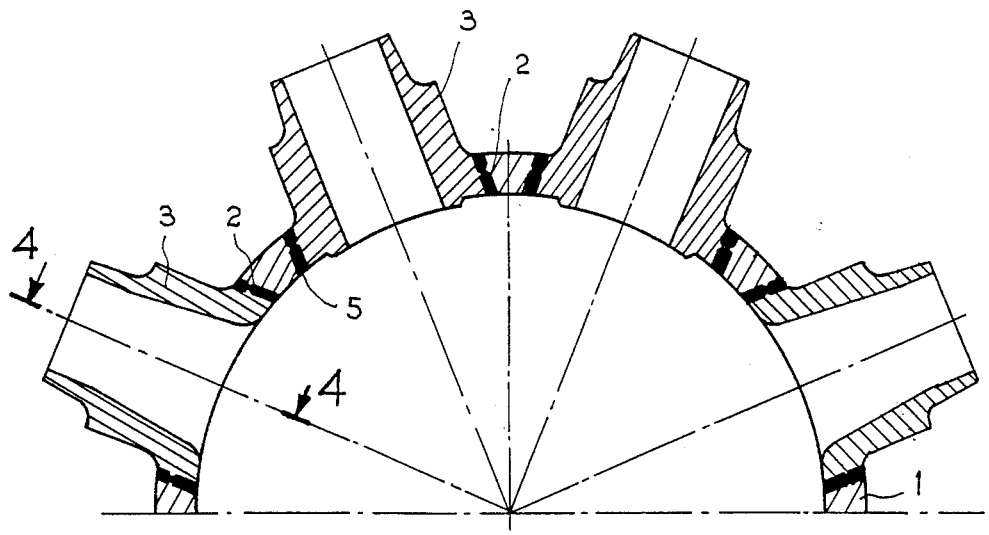
FIG. 1 is a half-view in cross-section in the region of the pipes, of a pipe-carrying shell having a "set-in" configuration.
Figure 4A:
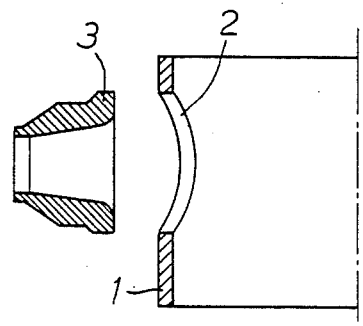
FIGS. 4A and 4B are views in axial section such as 4—4 in FIG. 1, of a pipe-carrying shell having a "set-in" configuration, before and after the welding of a pipe.
Figure 4B:
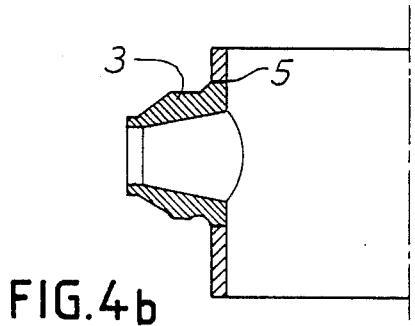

FIGS. 1, 4A and 4B show a vessel shell 1 in which openings 2 have been machined, their diameter being greater than the external diameter of the pipes 3 which are to be fastened to the shell 1.

The whole of the pipe-carrying shell, which is intended for a nuclear reactor with four loops, comprises eight openings, each intended to receive a pipe 3. The pipes 3 are of two types, according to whether they are intended to be connected to a hot leg or to a cold leg of a primary circuit loop. The pipes of the two types are distinguished in that their bore is either of cylindrical shape or of substantially frusto-conical shape.

The pipe 3 and the opening 2 are machined so as to form annular edges in corresponding positions permitting two welding chamfers to be determined when the pipe 3 is placed in position inside the opening 2. One of the welding chamfers opens towards the outside of the pipe-carrying shell and the other welding chamfer towards the inside. The assembly of the two chamfers 5 is filled with filler metal by automatic submerged arc welding It can be seen in FIGS. 1 and 4B that the weld filler metal 5 forms a part of the barrier separating the presurized water inside the vessel from the external environment.

Figure 2:
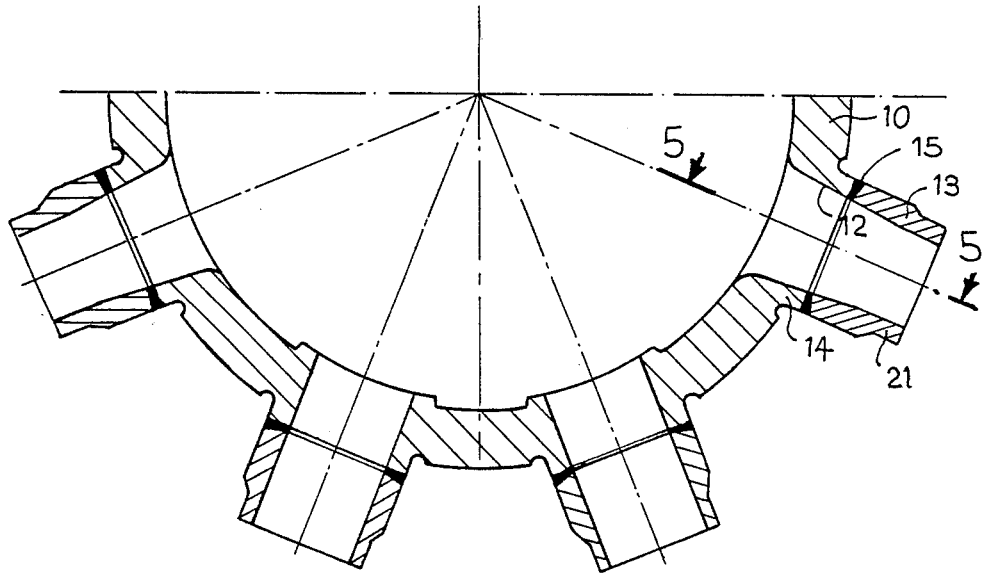
FIG. 2 is a sectional view similar to the view in FIG. 1, of a pipe-carrying shell having a "set-on" configuration according to the prior art.
Figure 5A:
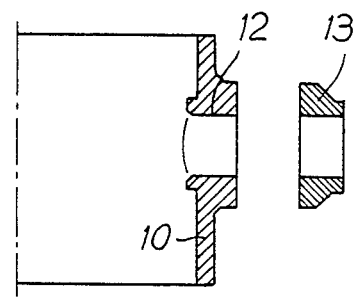
FIGS. 5A and 5B are views in axial section, such as the section 5—5 in FIG. 2, of a pipe-carrying shell having a "set-on" configuration according to the prior art, before and after the welding of a pipe.
Figure 5B:
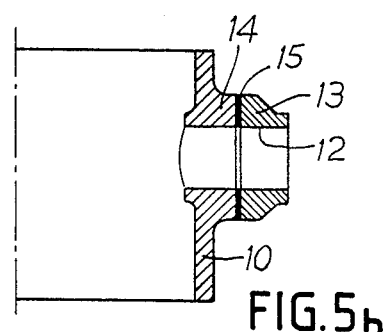

FIGS. 2, 5A and 5B show a second configuration of a pipe-carrying shell of a pressurized-water nuclear reactor and its method of production. The pipe-carrying shell 10 comprises passage openings 12 whose diameter corresponds substantially to the internal diameter of the pipe 13. The pipes 13 are set onto the external surface of the pipe-carrying shell 10, so that their internal bore is located in the precise extension of the opening 12 passing through the shell 10. The pipes 13 are fastened to the external wall of the shell 10, in the region of the projecting annular parts 14, each surrounding an opening 12.

Each of the pipes 13 is fastened by welding over its entire thickness to the corresponding projecting part 14. The filler metal 15 may be deposited by automatic submerged arc welding, in a single chamfer, from the outside of the pipe 13. Corresponding edges on the pipe and the projecting part 14 enable the chamfer to be determined and closed inwards.

As can be seen in FIGS. 2 and 5B, in this "set-on" configuration the weld filler metal 15 forms a connecting region between the vessel and the corresponding leg of the primary circuit. A failure at the connecting region 15 is therefore equivalent to a failure of a branch of the primary circuit and not to a vessel failure.

Both in the case of the "set-in" configuration shown in FIGS. 1, 4A and 4B, and in the case of the "set-on" configuration shown in FIGS. 2, 5A and 5B, the welding operation to form the welded filler metal joints 5 and 15 must be carried out with the greatest care and must be continually supervised, in order to ensure a perfect quality of the welded joint. Furthermore, the edges determining the chamfers must be removed by machining after partial filling of the chamfer(s).

All these operations, which must be carried out from the outside or the inside of the pipe-carrying shell, are extremely lengthy and tricky.

In the case of a pipe-carrying shell whose diameter is close to 4.50 m, the thickness of the pipe-carrying shell 1, in the case of the "set-in" configuration, is slightly below 300 mm. The thickness of the pipes is 300 mm.

In the case of the "set-on" configuration shown in FIGS. 2, 5A and 5B, for the same vessel diameter close to 4.50 m, the thickness of the main part of the shell 10 is close to 400 mm and the thickness of the shell 10 around the openings 12 is of the order of 450 mm, the thickness of the shell 10 being increased by the presence of the projecting parts 14 in these regions. The thickness of the pipes, along which the welded joint 15 is produced, is of the order of 150 mm.

It appears, therefore, that the "set-on" configuration shown in FIGS. 2, 5A and 5B requires the use of a shell 10 of a thickness which is very greatly increased compared with the case of the "set-in" configuration.

The presence of the projecting parts 14 is necessary to make it possible to carry out the welding in a region which is sufficiently distant from the external surface of the shell 10 to allow the welding head to pass.

Figure 3:
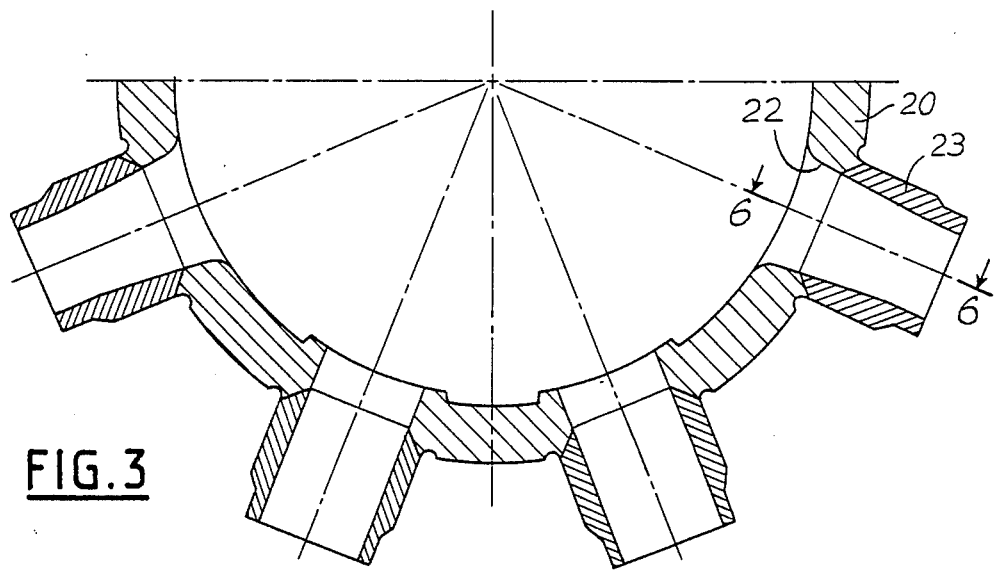
FIG. 3 is a sectional half-view similar to FIGS. 1 and 2, of a pipe-carrying shell having a "set-on" configuration and produced according to the process of the invention.

FIGS. 3 and 6B show a pipe-carrying shell 20 to which pipes 23 have been fastened using the process according to the invention. The pipe 20 comprises eight passage openings 22 whose internal diameter corresponds to the internal diameter of the pipes 23.

As can be seen in FIG. 6A, showing the pipe-carrying shell 20 and the pipe 23 before their assembly, the end part of the pipe 23 intended to come into assembly contact with the shell 20 is machined to form a connecting surface of frusto-conical shape 24.

The shell 20 s machined, along a part of its thickness, in the region of the opening 22, to form a frusto-conical connecting surface 25 whose shape corresponds perfectly to the shape of the frusto-conical connecting surface 24 of the pipe 23. The surface 24 has a section whose transverse dimension decreases towards the end of the pipe and the surface 25 of the opening 22 is widened towards the outside of the shell 20. The apex half-angle of the frusto-conical surfaces 24 and 25 is substantially equal to 45°. The surface 25 opens with its widened part onto the external surface of the shell 20. The engagement of the end for connecting the pipe 23 to the inside of the widened frusto-conical part 25 of the opening 22 can therefore be easily produced. The two corresponding frusto-conical surfaces 24 and 25 have the axis of the pipe and the axis of the opening 22 as their axes, respectively. Both these axes coincide when the pipes are placed in position as shown in FIGS. 3 and 6B.

As can be seen in FIGS. 3 and 7, the pipe-carrying shell 20 does not comprise any additional thickness in the region of the passage opening 22 onto which the pipe 23 is set.

The shell 20 comprises only a toroidal groove 28 at which the connecting region 27 between the pipe 23 and the widened opening of the shell 20 opens.

The groove 28 makes it possible to produce a clearance which ensures better access to the outer end of the connecting region between the pipe 23 and the widened opening of the shell 20.

As can be seen in FIG. 8, welding of the pipes 23 to the shell 20 is carried out inside a large enclosure 30 from which the atmosphere may be evacuated by a pumping system capable of producing a hard vacuum of the order of 10−5 mm of mercury.

The enclosure 30 contains an electron gun 31 mounted so that it can move in the vertical direction on columns 34 and capable of being pointed downwards, in a direction forming an angle of substantially 45° to the vertical. The pipe-carrying shell 20 rests on a platform 37, itself mounted so that it can rotate around a vertical axis on a trolley 36 which can be moved in translation inside the enclosure 30. The shell 20 rests on the platform 37 by means of rollers, with a horizontal axis, of a turn gear 40.

During the electron beam welding of the pipe 23 to the shell 20, the electron gun 31 is fastened in a vertical position and inclined, the trolley 36 is in a fixed position in the enclosure and the shell 20 is in a fixed position on the turn gear 40. The position of the shell 20 and of the pipe 23 is such that the beam of the electron gun 31 is guided perfectly along a generatrix of the frusto-conical connecting surface between the pipe and the shell. The axis of the pipe 23 which is being welded coincides with the axis of rotation of the platform 37. The platform 37 is caused to rotate slowly, so that the electron beam travels over the entire frusto-conical connecting region between the pipe and the shell, at a speed of 10 to 40 cm/min.

An electron gun with a power rating of 200 kW, capable of carrying out the welding of the pipe to the shell in a single pass without filler metal, is employed.

The pipe-carrying shell 20 and the pipes 23 have been produced by forging a steel containing chiefly 2 to 2.5% of chromium, 0.90 to 1.10% of molybdenum and a carbon content not exceeding 0.15%. The target chromium and molybdenum contents for this steel are 2.25% and 1%, respectively.

A steel of this kind, which is known and is employed for the manufacture of components intended for the petrochemical industry, has quenchability properties which are perfectly suited to electron beam welding in the case of components whose thickness is greater than 100 mm.

In the case of the welding of a pipe 23, the thickness of the welded joint is between 150 and 170 mm, which remains perfectly compatible with the performance of the electron beam welding unit whose capacity extends up to thicknesses of the order of 300 mm.

The quality of the welded joint has been found to be perfectly satisfactory.

In order to perform the successive welding of the eight pipes to the pipe-carrying shell 20, this shell is oriented around its axis, by virtue of the turn gear 40, so as to bring the pipe to be welded into a high position with its axis vertical.

The presence of the toroidal groove 28 on the shell 20 around the emerging widened part of the opening 22 allows the electron beam to have better access to the connecting region.

In the case of a pressurized-water reactor vessel whose pipe-carrying shell 20 has a diameter close to 4.50 m, the thickness of this pipe-carrying shell is limited to a value below 350 mm when the process for connecting the pipes according to the invention is employed. This process makes it possible, in fact, to avoid the presence of outward projecting parts of the shell 20 and hence of local additional thicknesses in the vicinity of the passage openings 22. The electron beam, inclined at 45°, can, in fact, easily reach the connecting region, with the electron gun itself being situated at a certain distance from the pipe, as shown in FIG. 8.

The process according to the invention makes it possible to perform the fastening of pipes according to a "set-on" arrangement to a pipe-carrying shell whose thickness is substantially smaller than that required for the "set-on" configurations according to the prior art.

FIG. 7 shows a pipe 23 which has been fastened to a pipe-carrying shell 20 using the process according to the invention, with the production of a welded joint 27 using an electron beam and without filler metal.

The internal bore of the pipe 23 is lined with a layer of stainless steel 41 stopping in the vicinity of the end of the pipe, which has been produced inside the pipe during its manufacture and before its welding to the shell 20.

Similarly, the shell 20 is lined internally with a layer of stainless steel 42 which stops in the vicinity of the openings 22.

After the pipe 23 has been welded to the shell 20 using an electron beam, forming a connecting region 27, the stainless lining inside the pipe and inside the pipe-carrying shell must be completed by depositing a layer of stainless steel 43 connecting the layer 41 and the layer 42 and covering the connecting region 27.

The connecting surfaces of the pipe 23 and of the shell 20, 24 and 25 respectively, of frusto-conical shape, may be produced by machining each of the pipes 23 and the shell 20 at their corresponding openings 22, just before they are assembled. The pipes 23 comprise a prefabricated end intended to form the frusto-conical connecting surface 24.

The main advantages of the process according to the invention are that it permits rapid fastening of the pipes to the pipe-carrying shell without the use of filler metal. The thickness of this shell may be limited both in its main part and in its part for connection to the pipes.

In all cases, the apex semi-angle of the frusto-conical surfaces will need to be between 30° and 60° in order to obtain both sufficient accessibility to the connecting region from the outside of the pipe and of the shell and satisfactory fastening of the pipe.

The invention may be applied to different shell members and to pipes connected to these shells. The invention may also be applied, for example, to the fastening of pipes to a spherical cap, preferably at an opening centered on the axis of revolution of the spherical cap. Such pipe connections are frequent in the case of chemical or petrochemical reactors.

Steels other than that which has been described in the case of the production of the shell and of the pipes may be used. The steel employed must, however, have quenchability characteristics which are sufficient to permit a welded joint of high quality to be obtained.

In all cases, the pipe and the wall member to which this pipe is fastened must have an overlap region extending over only a part of the wall thickness. Advantageously, this overlap region will extend at most over one-third of the wall thickness. In the case where the overlap region extends over a substantial part or over the whole of the wall thickness, the disadvantages of the fastening according to the "set-on" configuration of the pipes are encountered once again.

The invention finds application not only in the field of nuclear reactors but also in the field of chemical or petrochemical reactors and of pressure vessels in general.

I claim:

1. Process for fastening a pipe (23) by welding to a thick wall member (20) comprising at least one passage opening (22) whose diameter is substantially equal to the internal diameter of the pipe (23), the pipe (23) being welded over its entire thickness into the extension of the opening (22) on one of the sides or external side of the wall (20), comprising the steps of
   (a) producing on an end part of the pipe a connecting surface (24) of frusto-conical shape whose axis coincides with an axis of the pipe (23) having an apex semi-angle of between 30° and 60° and a section of transverse dimension decreasing towards the end of the pipe (23);
   (b) producing on the wall member (20), on only a part of its thickness, in the region of the opening (22) and coaxially with said opening, a connecting surface (25) of frusto-conical shape corresponding to the shape of the connecting surface (24) of the pipe (23) opening onto the external side of the wall (20) and widened in the direction of this side of the wall (20);
   (c) locating the connecting surfaces of the pipe (23) and of the wall (20) so that they coincide; and
   (d) welding the pipe (23) and the wall member (20) using an electron beam in a single pass and without filler metal along their connecting surfaces (24, 25), from an external side of the wall.

2. Process according to claim 1, wherein the apex semi-angle of the connecting surfaces (24, 25) is substantially equal to 45°.

3. Process according to claim 1 or 2, wherein the wall member (20) comprises a groove of toroidal shape (28) around the opening (22), in the place where the widened part of the connecting surface (25) opens.

4. Process according to claim 1 or 2, wherein the wall member (20) and the pipe (23) are made of a steel containing mainly 2 to 2.50% of chromium and 0.90 to 1.10% of molybdenum and a carbon content of up to 0.15%.

5. Process according to claim 1 or 2, in the case where the wall member (20) is a pipe-carrying shell of a pressurized-water nuclear reactor vessel, wherein the pipe-carrying shell has a diameter close to 4.50 m and a thickness below 350 mm.

* * * * *